United States Patent
Bradley

(10) Patent No.: US 9,355,053 B2
(45) Date of Patent: May 31, 2016

(54) PCIE SMBUS SLAVE ADDRESS SELF-SELECTION

(75) Inventor: Christopher N. Bradley, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 408 days.

(21) Appl. No.: 13/997,905

(22) PCT Filed: Jan. 12, 2012

(86) PCT No.: PCT/US2012/021127
§ 371 (c)(1),
(2), (4) Date: Jun. 25, 2013

(87) PCT Pub. No.: WO2013/105963
PCT Pub. Date: Jul. 18, 2013

(65) Prior Publication Data
US 2013/0275647 A1    Oct. 17, 2013

(51) Int. Cl.
*G06F 13/38* (2006.01)
*G06F 13/42* (2006.01)
*G06F 11/00* (2006.01)

(52) U.S. Cl.
CPC .......... *G06F 13/385* (2013.01); *G06F 13/4291* (2013.01)

(58) Field of Classification Search
CPC ............ G06F 13/38; G06F 11/00; G06F 3/00
USPC .............................................. 710/110, 104, 8
See application file for complete search history.

(56) References Cited

U.S. PATENT DOCUMENTS

| | | | | |
|---|---|---|---|---|
| 5,987,554 A * | 11/1999 | Liu | ........................... | G06F 1/20 710/260 |
| 6,973,414 B2 * | 12/2005 | Kuo | ........................ | G06F 1/206 702/186 |

(Continued)

FOREIGN PATENT DOCUMENTS

| | | |
|---|---|---|
| EP | 1895431 | 3/2008 |
| TW | 200923670 A | 6/2009 |
| TW | I329806 B1 | 9/2010 |

OTHER PUBLICATIONS

Office Action and Taiwan Search Report from foreign counterpart Taiwan Patent Application No. 102100559, mailed Oct. 3, 2014, 18 pages.

(Continued)

*Primary Examiner* — Christopher Shin
(74) *Attorney, Agent, or Firm* — Blakely, Sokoloff, Taylor & Zafman LLP

(57) ABSTRACT

Embodiments of the invention describe an apparatus, system and method for slave devices to "self-select" their own Inter-Integrated Circuit/System Management Bus (I2C/SMBus) slave addresses upon initialization. Embodiments of the invention describe logic/modules to retrieve a first SMBus slave address included in non-volatile memory for a slave device, wherein said slave device is communicatively coupled to a host system via an SMBus. A first message (e.g., a ping) is transmitted to the first SMBus slave address via the SMBus. If a response to the first message is not received, the first SMBus slave address is selected for the slave device. If a response to the first message is received, the first SMBus slave address is changed by an offset value to determine a second SMBus slave address for transmitting a second message via the SMBus.

18 Claims, 5 Drawing Sheets

(56) References Cited

U.S. PATENT DOCUMENTS

| | | | | |
|---|---|---|---|---|
| 2003/0198185 | A1* | 10/2003 | Stancil | G06F 11/267 370/241 |
| 2004/0264453 | A1* | 12/2004 | Villefrance | H04L 29/06 370/389 |
| 2005/0080950 | A1* | 4/2005 | Rollig | G06F 11/221 710/52 |
| 2007/0294436 | A1* | 12/2007 | Chen | G06F 13/4291 710/3 |
| 2008/0059682 | A1* | 3/2008 | Cooley | G06F 13/4291 710/305 |
| 2008/0084886 | A1 | 4/2008 | Cooley | |
| 2008/0307154 | A1* | 12/2008 | Naderi | G06F 12/0292 711/103 |
| 2011/0302344 | A1* | 12/2011 | Bell | G06F 13/4291 710/110 |
| 2012/0054391 | A1* | 3/2012 | Hsu | H04L 12/2697 710/110 |
| 2014/0281080 | A1* | 9/2014 | Eddleman | G06F 13/4291 710/110 |

OTHER PUBLICATIONS

Notice of Allowance from foreign counterpart Taiwan Patent Application No. 102100559, mailed Feb. 10, 2015, 2 pages.

"PCT, International Search Report and Written Opinion of the International Searching Authority for Int'l Application No. PCT/US2012/021127", (Sep. 27, 2012), Whole Document.

PCT/US2012/021127 Notification Concerning Transmittal of International Preliminary Report on Patentability, mailed Jul. 24, 2014, 6 pages.

\* cited by examiner

PCIE SMBUS SLAVE ADDRESS SELF-SELECTION

CLAIM OF PRIORITY

This application is a U.S. National Phase application under 35 U.S.C. §371 of International Application No. PCT/US2012/021127, filed Jan. 12, 2012, entitled "PCIE SMBUS SLAVE ADDRESS SELF-SELECTION," the entire contents of which are incorporated herein by reference.

FIELD

Embodiments of the invention generally pertain to computing devices and more particularly to peripheral devices.

BACKGROUND

The System Management Bus (SMBus) (as described, for example, in the System Management Bus (SMBus) Specification of the SBS Implementers Forum, version 2.0, published Aug. 3, 2000), derived from the Inter-Integrated Circuit (I2C) bus, was developed by Intel Corporation to allow integrated circuits to communicate directly with each other via a simple bi-directional 2-wire bus. Peripheral devices, such as Peripheral Component Interconnect express (PCIe) devices (as described, for example, in The PCI Express Base Specification of the PCI Special Interest Group, Revision 3.0 published Nov. 18, 2010), may utilize the SMBus serial communication protocol for low bandwidth communication, such as power management, device status, clock data, etc.

FIG. 1 is an illustration of a plurality of peripheral devices coupled to a host system via an SMBus according to the prior art. Peripheral devices (i.e., slave devices) 102, 104 and 106 utilize SMBus 108 for low bandwidth communication. In some prior art solutions, more than one of said slave devices will have the same SMBus/I2C addresses, as there is no central authority to determine what SMBus/I2C slave addresses any device should have; thus, their address are predetermined by their respective vendors and multiple cards may be pre-configured with the same address. For these solutions, the host system includes slave device connectivity manager 110 to multiplex cards with the same SMBus/I2C addresses to prevent address conflicts. In other prior art solutions, slave device connectivity manager 110 includes an SMBus Address Resolution Protocol (ARP) central authority to assign and mange SMBus/I2C addresses for each of said devices 102, 104 and 106.

Said prior art slave device connectivity management solutions are undesirable, due to the added device component and manufacturing costs. What is needed is a solution included in a peripheral device that eliminates slave device connectivity conflicts regardless of SMBus configuration or the configuration of other peripheral devices.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of the invention describe an apparatus, system and method for slave devices to "self-select" their own Inter-Integrated Circuit/System Management Bus (I2C/SMBus) slave addresses upon initialization. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Embodiments of the invention describe logic/modules to retrieve a first SMBus slave address included in non-volatile memory for a slave device, wherein said slave device is communicatively coupled to a host system via an SMBus. A first message (e.g., a ping) is transmitted to the first SMBus slave address via the SMBus. If a response to the first message is not received, the first SMBus slave address is selected for the slave device. If a response to the first message is received, the first SMBus slave address is changed by an offset value to determine a second SMBus slave address for transmitting a second message via the SMBus.

Figure 1:
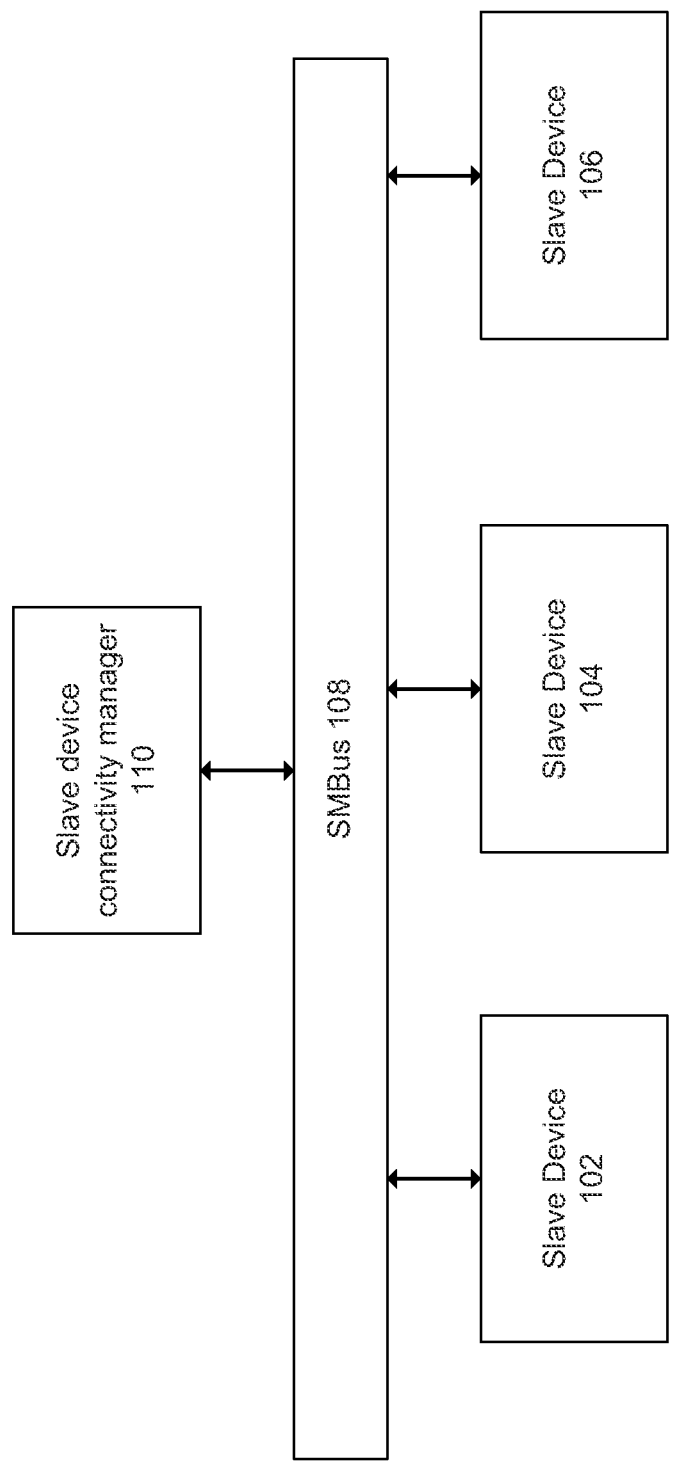
FIG. 1 is an illustration of a plurality of peripheral devices coupled to a host system via a System Management Bus (SMBus) according to the prior art.
Figure 2:
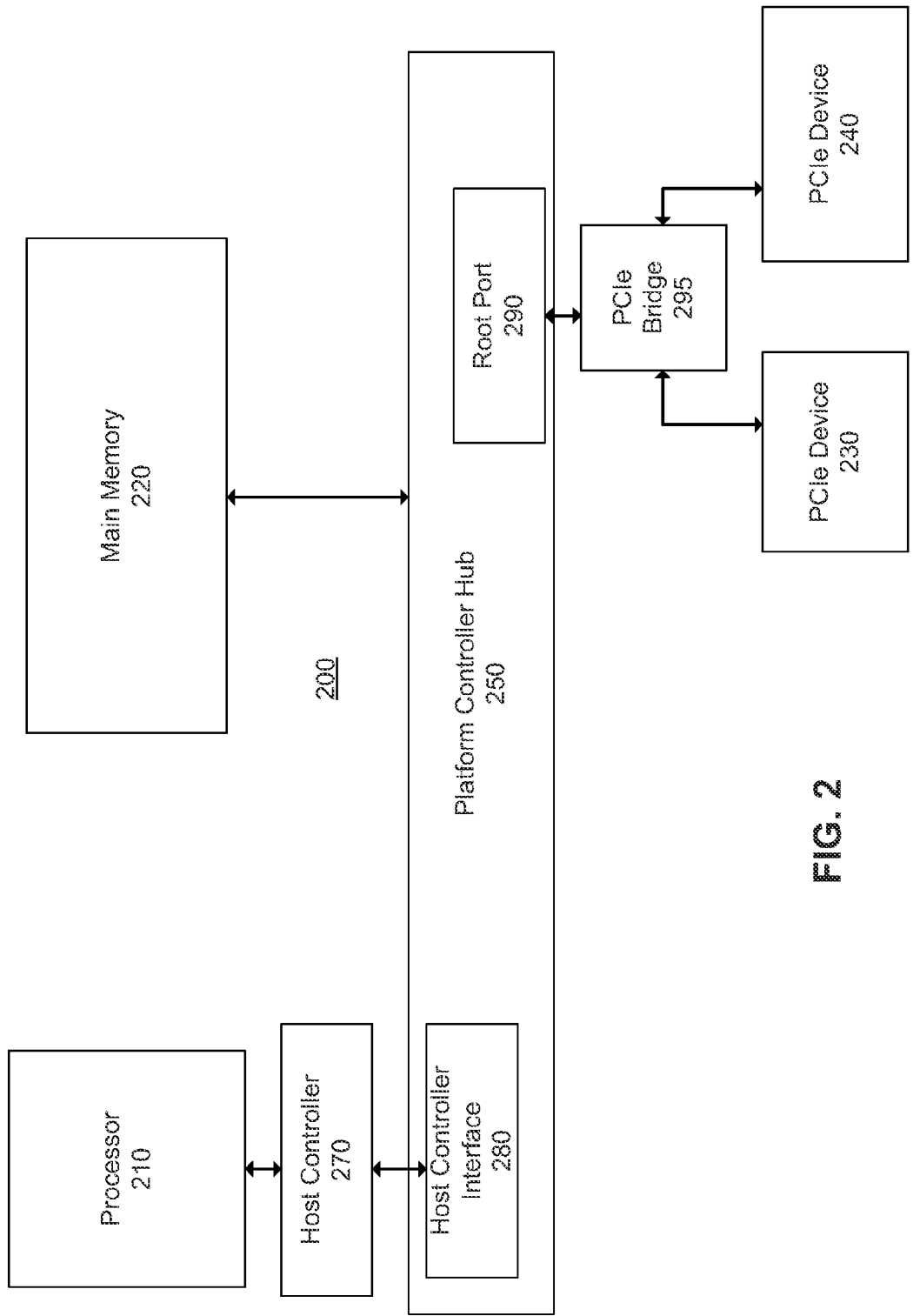
FIG. 2 is a block diagram of host platform hardware according to an embodiment of the invention.

FIG. 2 is a block diagram of host platform hardware according to an embodiment of the invention. In this embodiment, host system 200 includes processor 210 and main memory 220, which may include any combination of volatile and non-volatile memory, and may include an OS to be executed by processor 210.

Host controller 270 may be any controller capable of exchanging data and/or commands with a storage device, via host controller interface 280, in accordance with, for example, any of a Small Computer Systems Interface (SCSI) protocol, a Fibre Channel (FC) protocol, a SCSI over Internet Protocol (iSCSI), a Serial Attached SCSI (SAS) protocol, a Universal Serial Bus (USB) protocol and a SATA protocol.

In accordance with this embodiment, if host controller 270 is to exchange data and/or commands with a memory device in accordance with a SCSI protocol, the SCSI protocol may comply and/or be compatible with the protocol described in American National Standards Institute (ANSI) Small Computer Systems Interface-2 (SCSI-2) ANSI/InterNational Committee for Information Technology Standards (INCITS) 231-1994 Specification.

If host controller 270 is to exchange data and/or commands with a memory device in accordance with an FC protocol, the FC protocol may comply and/or be compatible with the protocol described in ANSI Standard Information Technology—Fibre Channel (FC) Physical and Signaling Interface-3 ANSI/INCITS 303-1998 (R2003) Specification.

If host controller 270 is to exchange data and/or commands with a memory device in accordance with an SAS protocol, the SAS protocol may comply and/or be compatible with the protocol described in ANSI Standard "Information Technology—Serial Attached SCSI (SAS-2), ANSI/INCITS 457-2010 Specification.

If host controller 270 is to exchange data and/or commands with a memory device in accordance with a SATA protocol, the SATA protocol may comply and/or be compatible with the protocol previously described.

If host controller 270 is to exchange data and/or commands with a memory device in accordance with a Universal Serial Bus (USB) Attached SCSI (UAS) protocol, the UAS protocol may comply and/or be compatible with the protocol described in Information Technology—USB Attached SCSI (UAS) T10 Working document T10/2095-D Revision 4 Mar. 9, 2010.

If host controller 270 is to exchange data and/or commands with a memory device in accordance with an iSCSI protocol, the iSCSI protocol may comply and/or be compatible with the protocol described in "Internet Small Computer Systems Interface (iSCSI)" Network Working Group, Request for Comments: 3720, RFC—Proposed Standard (IETF Stream) published April 2004 by the Internet Engineering Task Force, Internet Engineering Task Force Secretariat c/o Corporation for National Research Initiatives, 2895 Preston White Drive, Suite 200, Reston, Va. 20191, United States of America.

Of course, alternatively or additionally, host controller 270 may exchange data and/or commands with a memory device via one or more other and/or additional protocols without departing from this embodiment.

Platform Controller Hub (PCH) 250 may include modules or logic to manage the interconnections between the above described components of host system 200 and various peripheral devices. PCIe devices 230 and 240 are shown to be coupled to PCIe bridge 295, which is coupled to root port 290. It is understood that PCIe bridge 295 acts as a "switch" for PCIe devices 230 and 240, while root port 290 acts as an interconnect to processor 210 and main memory 220.

Host system 200 includes an SMBus utilized by PCIe devices 230 and 240 for "out of band manageability" (i.e., communication for said devices to manage their power, communicate device or component status, etc.). In embodiments of the invention, said devices include logic or modules to "self-select" their own I2C/SMBus slave addresses upon initialization. As described below, no additional hardware is required in host system 200 for each of said PCIe devices to include their own unique address, as each device includes modules/logic to adapt and avoid all other devices on the PCIe SMBus, nondestructively, without any specific knowledge of system SMBus configuration or other device card configuration.

Figure 3:
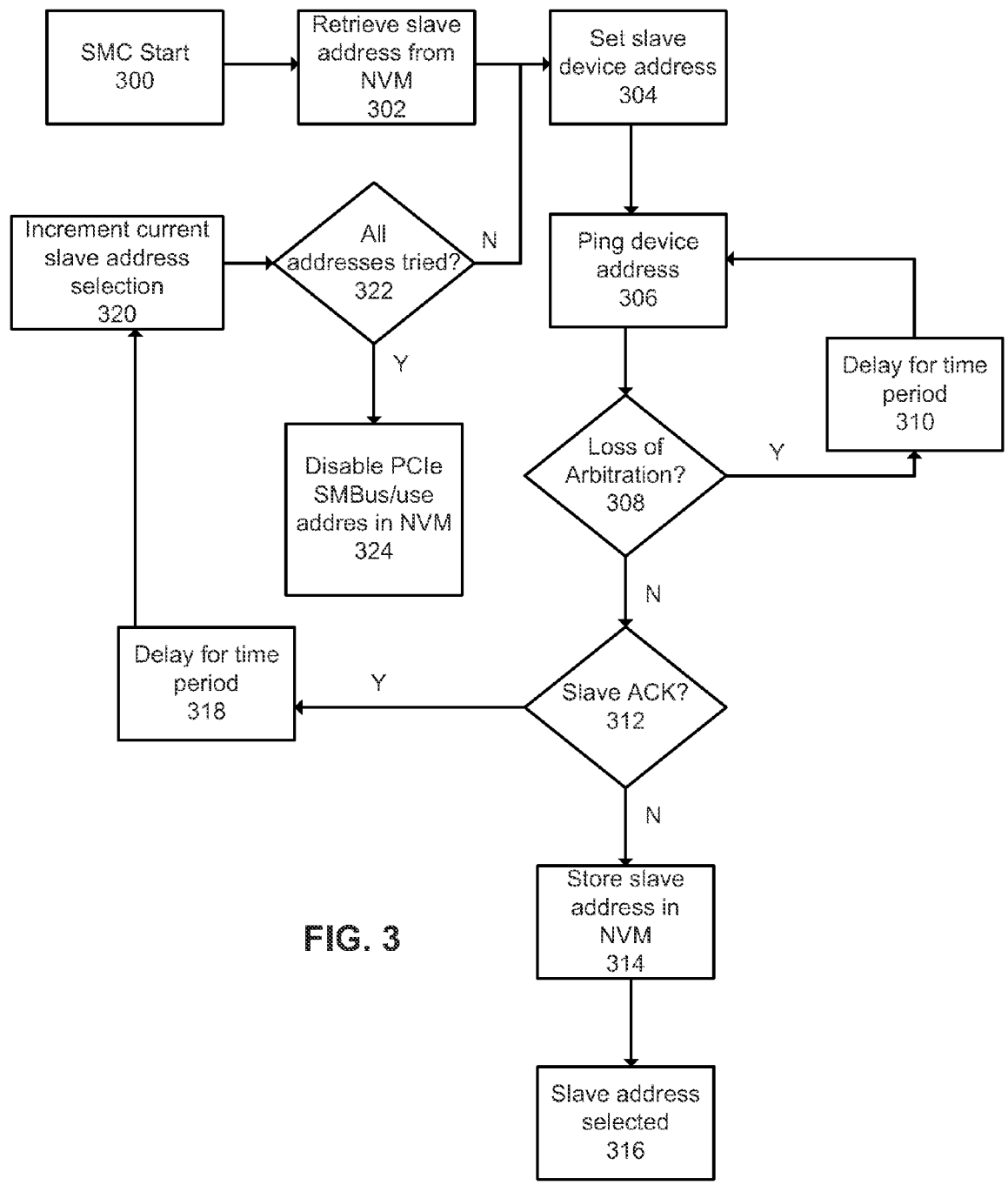
FIG. 3 is a flow diagram of a process to manage slave devices according to an embodiment of the invention.

FIG. 3 is a flow diagram of a process to manage slave devices according to an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Process 300 is executed by an onboard System Management controller (SMC) included in a peripheral device to "self-select" its own I2C/SMBus slave address upon initialization. A pre-determined I2C/SMBus slave address (e.g., an initial address selected by the peripheral device's vendor) is retrieved from non-volatile storage, 302. As described below, this pre-determined address may also be saved from a previously executed process to select an I2C/SMBus slave address. For operations described below, this address is herein referred to as the "current" slave address.

The SMC sets the peripheral device respond to the current slave address, 304, and performs an I2C "ping"—i.e., a write with no data, in order to determine if any other peripheral devices coupled to the SMBus respond to the current slave address, 306. In this embodiment, in the case that two devices attempt to initiate a transfer simultaneously, an arbitration scheme forces one device to give up the SMBus. This arbitration scheme is non-destructive (one device wins and no information is lost), so if the above describe "ping" is subject to a loss of arbitration, 308, the SMC waits of a certain period of time (e.g., a random period of time), 310, before attempting to perform the ping again.

If no other slave device acknowledges the ping, 312, the current slave address is saved in non-volatile memory, 314 and the address is selected for the peripheral device, 316. If another slave device acknowledges the ping, the SMC controller waits for a certain period of time (e.g., a random period of time), 318, before changing the current slave address by an offset value, 320. In this embodiment, the current slave address is incremented, but in other embodiments, any other adjustment to the current slave address may be utilized. The above described "ping" process is then retried.

In this embodiment, the SMC controller tracks whether all I2C/SMBus slave addresses have been attempted, 322. If they have, then the SMC controller either disables the PCIe SMBus for the peripheral device, or uses the address stored in non-volatile memory (if, for example, the host system includes a slave device connectivity solution that allows multiple devices to have the same I2C/SMBus slave address), 324.

Figure 4:
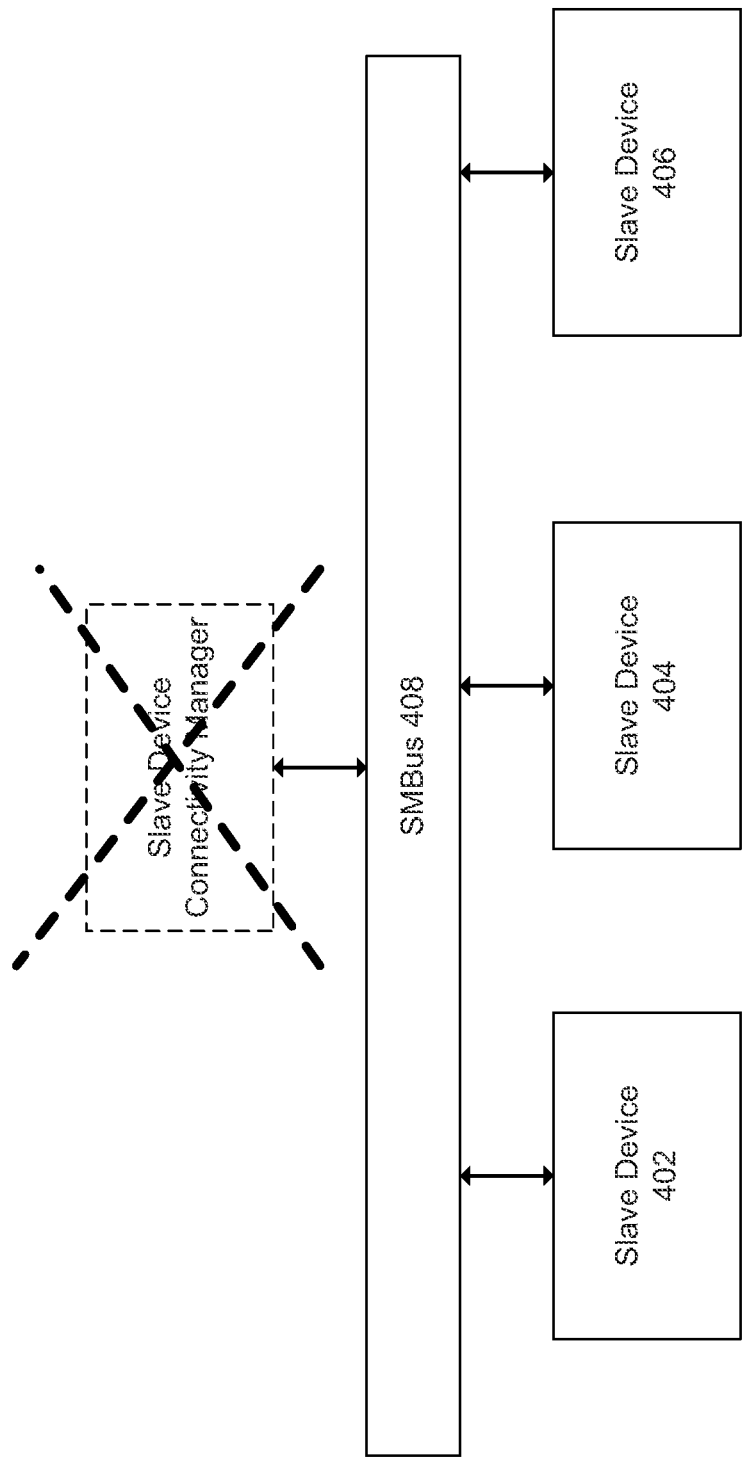
FIG. 4 is an illustration of a plurality of peripheral devices coupled to a host system via an SMBus according to an embodiment of the invention.

FIG. 4 is an illustration of a plurality of peripheral devices coupled to a host system via an SMBus according to an embodiment of the invention. In this embodiment, each of peripheral devices 402 and 404 include logic/modules to self-select their own I2C/SMBus slave addresses upon initialization for communicating via SMBus 408.

In this example, peripheral device 406 does not include the above described logic/module for I2C/SMBus slave address selection—i.e., said device utilizes a pre-determined slave address that cannot be changed during runtime. Because device 402 and 404 utilize embodiments of the invention, there is no conflict due to the presence of this prior art device; peripheral devices 402 and 404 simply avoid the pre-determined slave address of device 406 when executing processes to self-select their own addresses (e.g., device 406 will respond to the above described "ping" in FIG. 3, and thus device 402 and 404 avoid selecting this address). Therefore, the host system is not required to include slave device connectivity management solutions that are included in the prior art (e.g., multiplexing logic, an SMBus Address Resolution Protocol (ARP) central authority, etc).

Figure 5:
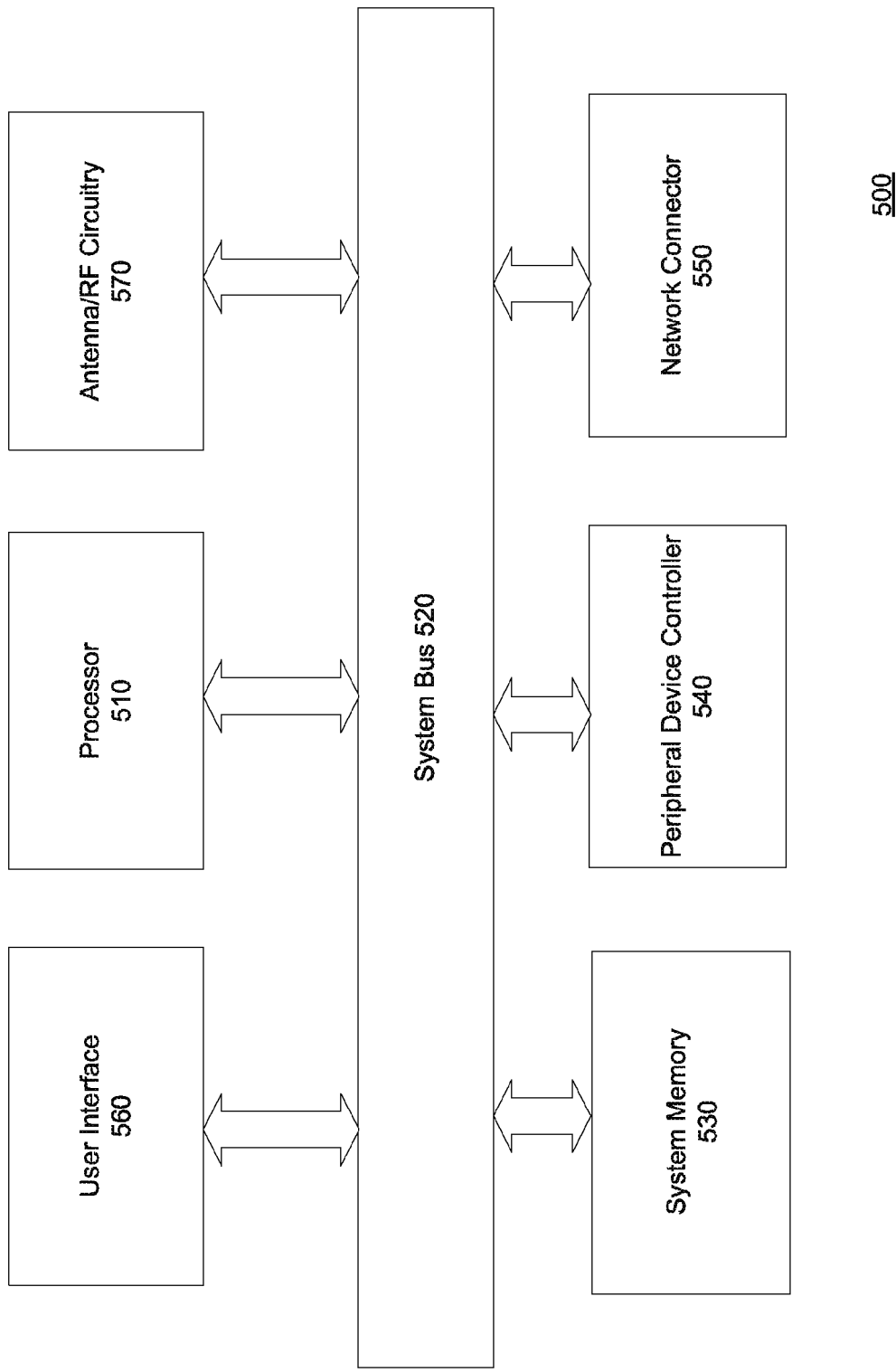
FIG. 5 is block diagram of a system to utilize an embodiment of the invention.

FIG. 5 is a block diagram of a system to utilize an embodiment of the invention. System 500 may describe a server platform, or may be included in, for example, a desktop computer, a laptop computer, a tablet computer, a netbook, a notebook computer, a personal digital assistant (PDA), a server, a workstation, a cellular telephone, a mobile computing device, an Internet appliance, an MP3 or media player or any other type of computing device.

System 500 may include processor 510 to exchange data, via system bus 520, with user interface 560, system memory 530, peripheral device controller 540 and network connector 550. Said peripheral device controller may be communicatively coupled to peripheral devices incorporating embodiments of the invention—i.e., said devices include logic or modules to "self-select" their own I2C/SMBus slave addresses upon initialization. As described above, no additional hardware is required in peripheral device controller 540 for PCIe devices to include their own unique address, as each device includes modules/logic to adapt and avoid all other devices on the PCIe SMBus, nondestructively, without any specific knowledge of system SMBus configuration or other device card configuration.

System 500 may further include antenna and RF circuitry 570 to send and receive signals to be processed by the various elements of system 500. The above described antenna may be a directional antenna or an omni-directional antenna. As used herein, the term omni-directional antenna refers to any antenna having a substantially uniform pattern in at least one plane. For example, in some embodiments, said antenna may be an omni-directional antenna such as a dipole antenna, or a quarter wave antenna. Also for example, in some embodiments, said antenna may be a directional antenna such as a parabolic dish antenna, a patch antenna, or a Yagi antenna. In some embodiments, system 500 may include multiple physical antennas.

While shown to be separate from network connector 550, it is to be understood that in other embodiments, antenna and RF circuitry 570 may comprise a wireless interface to operate in accordance with, but not limited to, the IEEE 802.11 standard and its related family, Home Plug AV (HPAV), Ultra Wide Band (UWB), Bluetooth, WiMax, or any other form of wireless communication protocol.

Various components referred to above as processes, servers, or tools described herein may be a means for performing the functions described. Each component described herein includes software or hardware, or a combination of these. The components can be implemented as software modules, hardware modules, special-purpose hardware (e.g., application specific hardware, ASICs, DSPs, etc.), embedded controllers, hardwired circuitry, etc. Software content (e.g., data, instructions, configuration) may be provided via an article of manufacture including a computer storage readable medium, which provides content that represents instructions that can be executed. The content may result in a computer performing various functions/operations described herein. A computer readable storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable storage medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The invention claimed is:

1. A method comprising:
retrieving a first slave address included in non-volatile memory for addressing a slave device communicatively coupled to a host system via a system management bus (SMBus);
transmitting, by the slave device, a first message to the first slave address via the SMBus;
in response to the slave device not receiving a response to the first message, selecting, by the slave device, the first slave address for addressing the slave device; and
in response to the slave device receiving a response to the first message, changing, by the slave device, the first slave address by an offset value to determine a second slave address for transmitting a second message via the SMBus.

2. The method of claim 1, further comprising:
waiting for a time value prior to transmitting the second message to the second slave address.

3. The method of claim 1, wherein changing the first slave address by an offset value to determine a second slave address comprises incrementing the first slave address by the offset value.

4. The method of claim 1, further comprising:
in response to receiving an indication from an arbitration scheme of a message conflict, waiting for a time value prior to re-transmitting the first message to the first slave address via the SMBus.

5. The method of claim 1, further comprising:
in response to receiving a response to the second message, disabling an SMBus interface of the slave device.

6. The method of claim 1, further comprising:
in response to receiving a response to the second message, selecting the first slave address for the slave device.

7. An apparatus comprising:
non-volatile memory;
a Peripheral Component Interconnect express (PCIe) System Management Bus (SMBus) interconnect for exchanging data with an SMBus of a host system; and
a device having a System Management Controller (SMC) to:
retrieve a first SMBus slave address included in the non-volatile memory;
transmit a first message to the first SMBus slave address via the SMBus;
in response to not receiving a response to the first message, select the first SMBus slave address for use in addressing the device on the SMBus; and
in response to receiving a response to the first message, change the first SMBus slave address by an offset value to determine a second SMBus slave address for transmitting a second message via the SMBus.

8. The apparatus of claim 7, the SMC to further:
wait for a time value prior to transmitting the second message to the second SMBus slave address.

9. The apparatus of claim 7, wherein changing the first SMBus slave address by an offset value to determine a second SMBus slave address comprises incrementing the first SMBus slave address value by the offset value.

10. The apparatus of claim 7, the SMC to further:
in response to receiving an indication from an arbitration scheme of a message conflict, wait for a time value prior to re-transmitting the first message to the first SMBus slave address.

11. The apparatus of claim 7, the SMC to further:
in response to receiving a response to the second message, disable the SMBus interconnect.

12. The apparatus of claim 7, the SMC to further:
in response to receiving a response to the second message, select the first SMBus slave address for the slave device.

13. A non-transitory computer readable storage medium including instructions that, when executed by a processor, cause the processor to perform a method comprising:
retrieving a first slave address included in non-volatile memory for addressing a slave device communicatively coupled to a host system via a system management bus (SMBus);
transmitting, by the slave device, a first message to the first slave address via the SMBus;
in response to the slave device not receiving a response to the first message, selecting, by the slave device, the first slave address for addressing the slave device; and
in response to the slave device receiving a response to the first message, changing, by the slave device, the first slave address by an offset value to determine a second slave address for transmitting a second message via the SMBus.

14. The non-transitory computer readable storage medium of 13, the method further comprising:
waiting for a time value prior to transmitting the second message to the second slave address.

15. The non-transitory computer readable storage medium of 13, wherein changing the first slave address by an offset value to determine a second slave address comprises incrementing the first slave address by the offset value.

16. The non-transitory computer readable storage medium of 13, the method further comprising:
in response to receiving an indication from an arbitration scheme of a message conflict, waiting for a time value prior to re-transmitting the first message to the first slave address via the SMBus.

17. The non-transitory computer readable storage medium of 13, the method further comprising:
in response to receiving a response to the second message, disabling an SMBus interface of the slave device.

18. The non-transitory computer readable storage medium of 13, the method further comprising:
in response to receiving a response to the second message, selecting the first slave address for the slave device.

* * * * *